United States Patent [19]

Bishop et al.

[11] Patent Number: 4,638,493

[45] Date of Patent: Jan. 20, 1987

[54] ADAPTIVE INTERFERENCE REJECTION FOR IMPROVED FREQUENCY HOP DETECTION

[75] Inventors: F. Avery Bishop; Ronald S. Leahy, both of Salt Lake City

[73] Assignee: Sperry Corporation, Blue Bell, Pa.

[21] Appl. No.: 745,487

[22] Filed: Jun. 17, 1985

[51] Int. Cl.⁴ .................... H04B 15/00; H04L 27/30
[52] U.S. Cl. ........................................ 375/1; 375/14; 375/99
[58] Field of Search .................. 375/1, 2.1, 2.2, 14, 375/58, 99; 455/29

[56] References Cited

U.S. PATENT DOCUMENTS

| | | | |
|---|---|---|---|
| 3,763,359 | 10/1973 | Cho et al. | 375/14 |
| 3,820,042 | 6/1974 | Mueller | 375/14 |
| 4,435,821 | 3/1984 | Ito et al. | 375/1 |
| 4,479,226 | 10/1984 | Prabhu et al. | 375/2.2 |

Primary Examiner—Robert L. Griffin
Assistant Examiner—Raymond C. Glenny
Attorney, Agent, or Firm—G. Donald Weber, Jr.; Glenn W. Bowen

[57] ABSTRACT

Adaptive filters are used to separate frequency hop signals to improve the detection and estimation of the frequency hop signals. In preferred embodiments, two or more adaptive filters (which can be connected in series or in parallel) exhibit different convergence characteristics to isolate a frequency hop signal.

13 Claims, 11 Drawing Figures

ADAPTIVE INTERFERENCE REJECTION FOR IMPROVED FREQUENCY HOP DETECTION

BACKGROUND

1. Field of the Invention

This invention is directed to signal detection systems, in general, and to systems which separate and isolate frequency hop signals from interference and other signals, in particular.

2. Prior Art

In a communications system there are several sources of degradation to a signal. One way to overcome the problem is through spreading the energy of the signal across a wide frequency range (referred to as "Spread Spectrum". Frequency hopping is one type of spread spectrum in which the energy of the signal is spread across the frequency range by varying the center frequency of the carrier signal wave. Such a signal is called a "hopper" because the center frequency changes in a more or less random pattern from one location to another and appears to "hop" across the spectrum. Generally, the hop range is in some RF region greater than a gigahertz (GHz) which is $10^9$ hertz, such as the X band. Thus, the hop frequency range can be contained in the X band, C band or K band. More generally, the possible hop frequencies for a hopper are DC to any frequency used by man for transmitting information. That part of the spectrum which is useful for transmitting through the atmosphere is usually called RF (Radio Frequency). That is, at lower frequencies it is difficult to transmit without special types of apparatus such as large antennas. Consequently, for most ordinary spread spectrum type communications, the spectrum is the region above 10 Ghz. However, this is limitative because much signal processing (especially in the invention described infra) can be done at IF. That is a local oscillator and filtering devices are used to bring the RF signal down to the IF region where the processing takes place. One of the major problems of frequency hop signals, especially in what is called ESM (i.e. electronic support measures) is monitoring a spectral region and detecting frequency hoppers. It is known that there are several advantages to spreading the spectrum of a signal, i.e. spreading the energy of the signal throughout the spectrum. One advantage is to defeat jamming. A second advantage is to make the signal more convert, in other words to make it more difficult to intercept, to find and to characterize the signal. The prior art devices or systems which detect frequency hop signals, generally, consist of a bank of bandpass filters, one filter at each location where a frequency hopper is expected. By having this bank of filters, the noise and all other errors are filtered out. Typically, this removes wideband interference, but narrowband interference in those particular cells will still show up in the corresponding bandpass filter. In addition, it is expensive to build a bank of bandpass filters.

An approach which might be used (but is not known to exist in the prior art) is to use one bandpass filter, with a variable center frequency which is varied in steps across the entire portion of the spectrum occupied by the frequency hop signal. This is equivalent to scanning with the bandpass filter. The advantage, of course, is that less hardware is required. However, the disadvantage is it takes time to scan across the spectrum whereupon waiting at each frequency might lead to missing something at a different frequency. Also, this technique does not eliminate narrowband interference.

One way to eliminate narrowband interference is to set a threshold. This can be accomplished by some kind of radiometric detection or power measurement which observes the average power across the spectrum and detects anything that is much above average. However, the process would have to define a threshold above which anything would be clipped off. This requires some intelligence, a lot of hardware, complex calculations and the like. This process does eliminate most of the narrowband interference. However, if the system clips off the signal, a little bit of the interference signal is left in the overall spectrum. On the other hand, if the system zeros out the signal (i.e. blanks it out), the system eliminates part of the spectrum which is an undesirable operation. What is desired is to eliminate the narrowband interference without affecting the frequency hopper.

SUMMARY OF THE INVENTION

The purpose of this invention is to monitor the signal spectrum and, through processing with adaptive filters, enhance any frequency hop signals which are present and improve the signal-to-noise ratio. In other words, this invention operates to suppress two types of interference and, therefore, make it easier to find the signal in the first place and also to characterize the signal and find out some of its parameters and properties after it has been detected.

DESCRIPTION OF A PREFERRED EMBODIMENT

Figure 1:
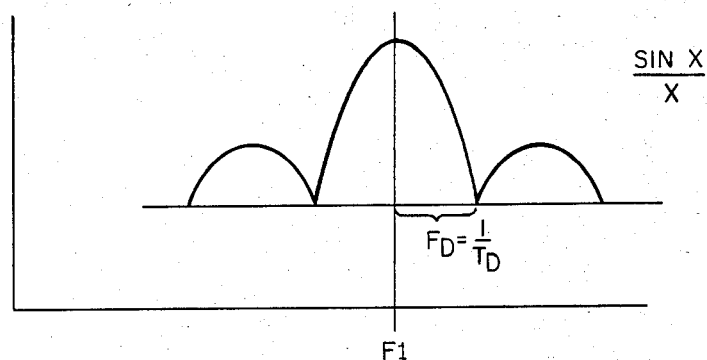
FIG. 1 is a graphic representation of the sin X/X waveform.

Referring now to FIG. 1, there is shown a graphic representation of a sin X/X function. In FIG. 1, the dwell frequency is F1. There are two important bandwidths associated with the frequency hop signal. One bandwidth is called the dwell bandwidth and is defined as the reciprocal of the dwell time. The dwell time is measured when the hopper dwells at a frequecy for a time. The spectrum that is seen by a spectrum analyzer is a sin X/X function centered about that dwell frequency the width of which is $2/T_D$ (where $T_D$ is the dwell time). Also, the one sided bandwidth $F_D$ (i.e. the dwell frequency) is equal to $1/T_D$ where $T_D$ equals the dwell time.

Figure 2:
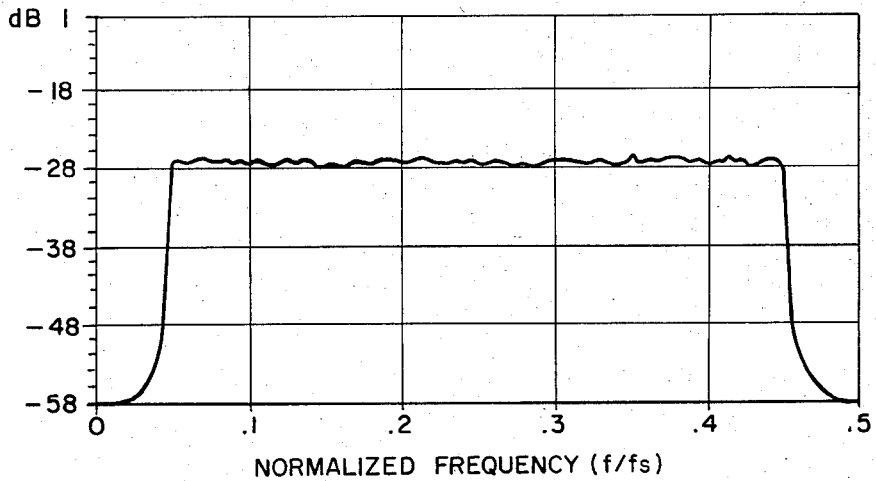
FIG. 2 is a graphic representation of the bandwidth of the hop range.

Referring now to FIG. 2, there is shown a graphic representation of the second bandwidth which is associated with the frequency hopper, viz. the hop range. This corresponds to the number $N_D$ of discrete dwell frequencies which the hopper can assume. Thus, the hop range is equal to $N_D \times F_D = F_B$ (where $F_B$ is the hop bandwidth). The second bandwidth of the hopper is much wider than the bandwidth seen in FIG. 1.

The central concept to perceive is that a hopper appears narrowband if viewed over a short time period, i.e. a time period less than one dwell time. Conversely, it appears wideband, if viewed over a long time period, i.e. a time period approaching $N_D \times T_D$. Thus, a frequency hopper has both narrowband and wideband properties.

The subject invention is utilized to separate a frequency hopper from interference by using an adaptive line enhancer (ALE) to distinguish the signal which is a frequency hopper from two types of interference. Typically, an adaptive line enhancer accepts an input signal consisting of wideband and narrowband waveforms. The ALE is able to separate those two waveforms at least within a first approximateion. This is accomplished by measuring a correlation between two waveforms, in particular the correlation between the input signal and a delayed version are thereof. The narrowband and the wideband waveforms are separated because the narrowband is correlated for a long time, whereas a wideband waveform has the opposite characteristic. If the function is wideband, that is, it occupies a large frequency range in the spectrum, the function is not correlated with a copy later on. Thus, a statistical measurement of the relationship between a wideband waveform with a copy of itself at a later time, finds very little relationship and averages out close to zero. Conversely, a statistical average of a narrowband waveform with a copy of itself at a later time, would produce large positive (or negative) correlation.

The adaptive line enhancer measures this relationship. It measures how closely related the input is with a delayed version of itself. The wideband part of the function does not correlate, while the narrowband does correlate. Therefore, the filter yields two outputs, viz. the filter output and the error output. Based on this correlation, the filter predicts the next input to the filter D steps ahead. The ALE then generates a difference between the predicted value and what actually did arrive at that point. This is called the error output. The ALE is not able to predict the uncorrelated wideband waveform, but it is able to predict the correlated narrowband waveform. Therefore, the actual filter output approximates the narrowband waveform and the error output (because the narrowband is subtracted) approximates the wideband output. Thus, by measuring the correlation and using the the difference in correlation times to distinguish wideband and narrowband waveforms, the ALE is able to separate, at least approximately, an input that consists of two types of functions. The line enhancer adjusts a set of tap weights to minimize the average squared error. The weights are multiplied by delayed versions of the input and added together to produce the output. There are many algorithms for computing the optimal set of weights. However, this invention is not directed to an algorithm for determining the set of weights. In determining the set of weights, the most practical known algorithims are iterative. That is, they start with a set of weights, add to that to get the next iteration, then add again to that to get the next iteration and so on. A feedback cycle is included to utilize the incoming information along with the error that has been generated with the present set of weights in order to correct toward the set of weights which is optimum, in the least-squares sense, for separating the narrowband components from the wideband components.

There is a trade-off relationship with these iterative algorithms. Generally, it is desirable to have them converge rapidly because that improves the performance, especially in the situation where signal conditions and the like are changing. Thus, fast convergence is one desirable property of any of these algorithms. However, after convergence, a high degree of accuracy is desired. Unfortunately, the algorithms which converge rapidly have relatively large residual error after convergence. On the other hand, algorithms with good residual error after convergence, usually converge very slowly. Thus, in a non-stationary environment, for example when the input signal is changing or the statistics of the correlation are changing, this trade-off must be considered.

Figure 3:
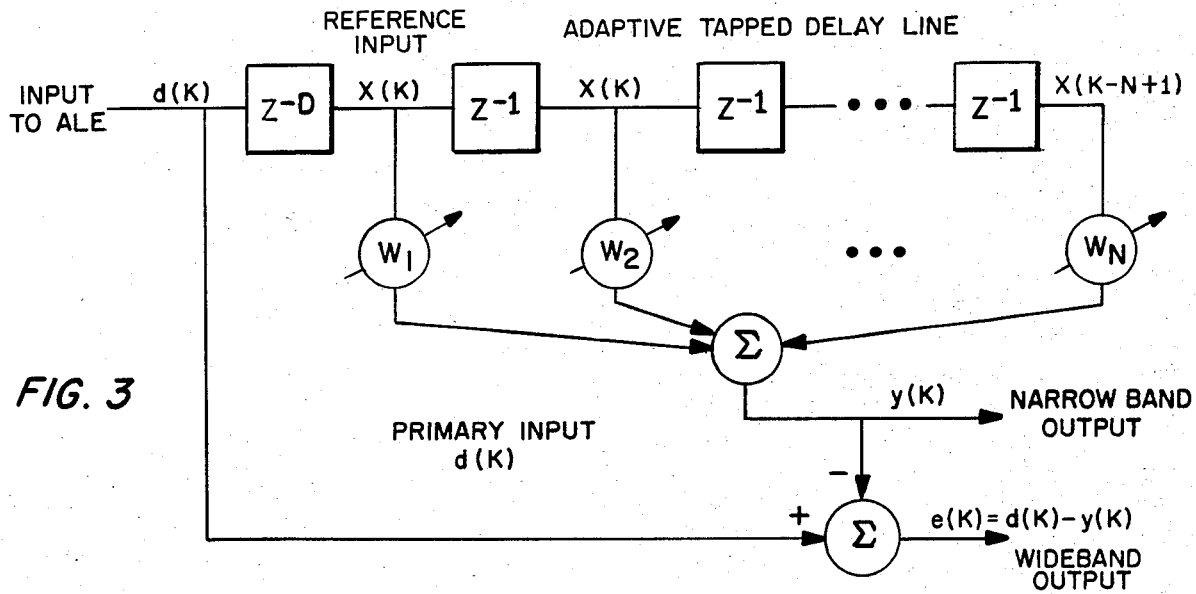
FIG. 3 is a schematic representation of a typical adaptive line enhancer (ALE).

In this regard, reference is made to FIG. 3 which depicts a typical ALE. The convergence rate of the filter (ALE) depends on two factors, i.e. the de-correlation delay and the algorithm convergence. Thus, the convergence time is a very important part of the algorithm. For further information about ALEs, reference is made to U.S. Pat. No. 4,238,746 to McCool et al.

Figure 4:
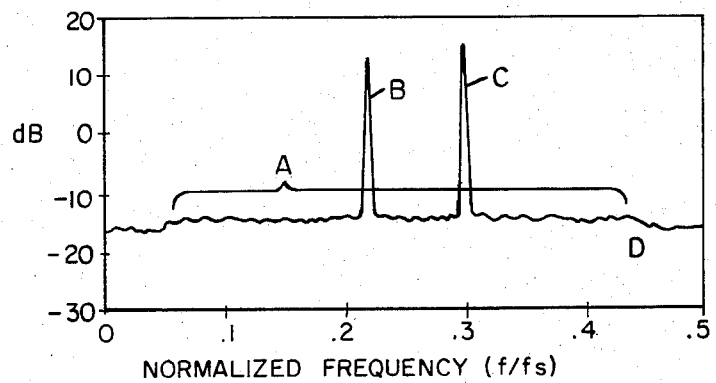
FIG. 4 is a graphic representation of a typical signal conditions as related to the instant invention.

Referring now to FIG. 4, there is shown a graphic representation of a typical signal condition. In this representation, there is shown frequency hopper signal A, together with narrowband interference signals B and C and a wideband noise signal D. It is desirable to determine the presence of a hopper in such a spectrum. A flat spectrum is a property of "white noise", and while this spectrum is not flat due to the hop signal, other factors such as "colored noise" cause the spectrum not to be flat. Clearly, it would be difficult to distinguish the hopper in that situation because it is low enough in the noise so it is hard to tell if it is really there. In addition, there is narrowband interference, as indicated by the spikes B and C. Because these signals have such high power at these fixed frequencies, it is difficult to measure the actual power of the hopper, hop dwell times and other like parameters. Known detection techniques will tend to measure these parameters as a long term dwell, or the like.

Figure 5:
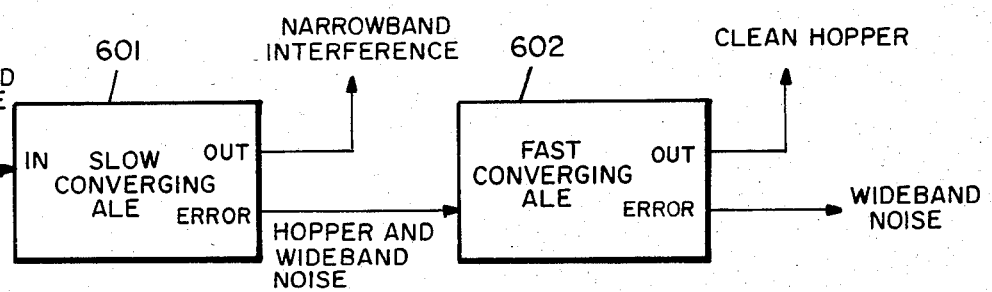
FIG. 5 is a block diagram of a time-bandwidth discrimination system of the instant invention.

Referring now to FIG. 5, there is shown a block diagram of a time-bandwidth discrimination system which includes a slow converging ALE 601 and a fast converging ALE 602 connected thereto. In accordance with this invention, the signal shown in FIG. 4 is passed through the system shown in FIG. 5. In particular, the signal is passed into the slow convergent adaptive line enhancer 601. Because it is slow converging, ALE 601 has a long time constant. The de-correlation delay and the convergence term are intentionally set to make this adaptive line enhancer take a long time to converge. This is equivalent to observing the frequency hopper over a long time period. In other words, as the ALE filter 601 is converging, the frequency hopper takes on many dwell frequencies so that FIG. 2 analysis applies. This is the signal which the slow converging adaptive line enhancer 601 sees. In other words the slow converging adaptive line enhancer 601 sees the hopper as wideband. Therefore, adaptive line enhancer 601 attempts to separate the narrowband and wideband waveforms and sends the narrowband interference out of its narrowband output port. Also, ALE 601 will send the hopper and the wideband noise of its wideband error port.

However the hopper is still contained in the wideband noise. Thus, the hopper and wideband noise (as seen in FIG. 4) is supplied to fast converging adaptive line enhancer 602. The time constant of ALE 602 is set as fast as possible. This can be accomplished in two ways. That is, the de-correlation delay can be set very short or a special up-date process (as defined by equation Eq. 1) can be used.

For faster convergence, Wedrow's algorithm can be modified as follows:

$$w(t+1) = \alpha w(t) + me(t)x(t) \qquad \text{Eq. (1)}$$

This equation (referred to as Leahy's algorithm) includes a positive decay factor which is less than unity and encourages the weights to "forget" the last dwell frequency rapidly. Using a Neumann series convergence argument, it can be shown that the Leahy algorithm converges to $$\hat{w}_{opt} = \left[ \frac{1-\alpha}{m} I + R_{xx} \right]^{-1} r_{xd} \qquad \text{Eq. (2)}$$

The addition of the term $(1\alpha-)/m$ to each of the diagonal elements $R_{xx}$ is equivalent to adding that much more uncorrelated noise to the system. Therefore, the filter response will have the appropriate shape, but the gain at the center (dwell) frequency will be reduced correspondingly. This effect is of little concern in application to frequency hop detection and characterization, because it does not affect the SNR. A more significant effect is that $T_c$ is inversely proportional to the noise power, whereby equation Eq. 1 reduces the BT product. While this approach causes an overall attenuation to the signal that it estimates, this is not a problem in this case because the strength of the signal is not critical.

By setting the de-correlation delay and the convergence time as short as possible, the effective observation time of adaptive line enhancer 602 appears to be very short so that it sees the narrowband model of the hopper (see FIG. 1). Therefore, ALE 602 sends the noise out the wideband port and sends the hopper signal to the narrowband output port, thereby producing a good, clean approximation of the hopper.

Figure 6:
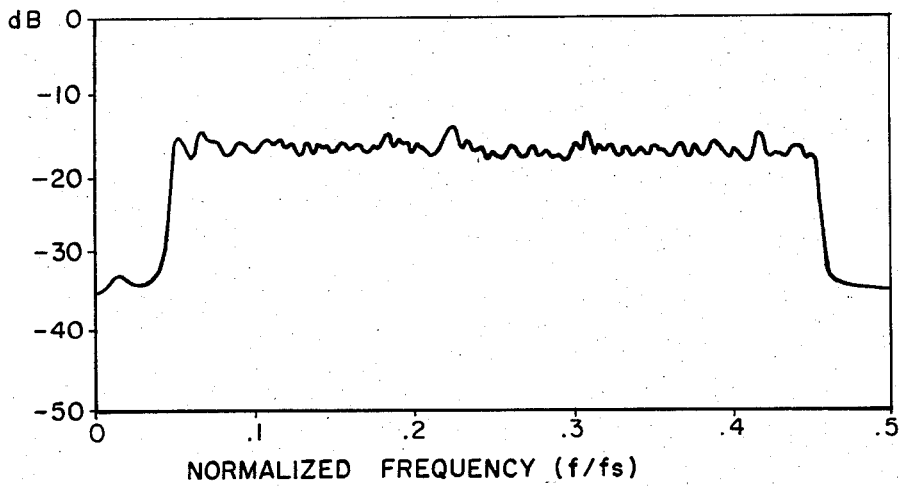
FIGS. 6 through 9 are graphic representations of signals produced relative to the instant invention.

The hopper alone, without the narrowband and the wideband interference, is seen in FIG. 6. In this enhanced hopper, the noise level is drastically reduced and there is, essentially, no narrowband interference to speak of nor is there a hole in the frequency hop spectrum. That is, these disadvantages mentioned earlier relative to the state of the art techniques are avoided.

Figure 7:
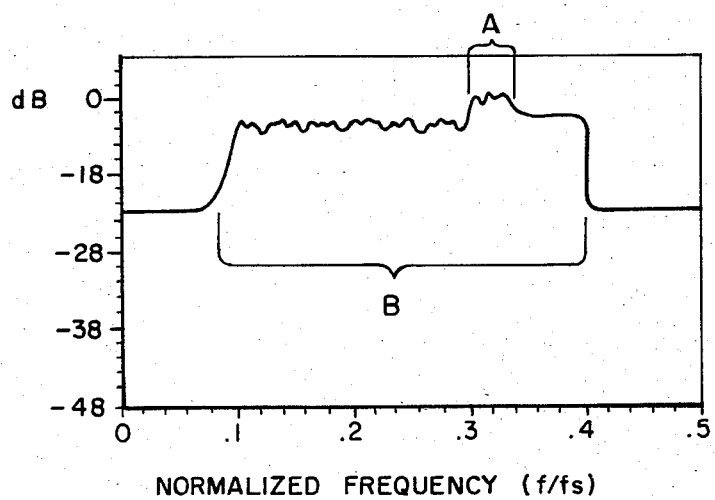

It should be noted that if the instantaneous bandwidth (i.e. the narrowest band occupied by the hoppers) of some frequency hoppers is wider than $1/T_D$ because there is data or spreading or some other modulation on the hopper during one dwell time, this condition would render the approach described above ineffective. In particular, filter 602 would be ineffective even though filter 601 would still work. That is, the system would still be effective in eliminating narrowband interference but it would not be effective in eliminating the wideband. Thus, a requirement of this system is that convergence rate of the fast converging line enhancer 602 must be much less than the reciprocal of the instantaneous bandwidth of the hopper. In a preferred embodiment dealing with with two hoppers, it is desirable to detect and characterize the hoppers, especially in a situation of two hoppers occupying approximately the same bandwidth as shown in FIG. 7. In FIG. 7, there is a hopper in the range from 0.10 to 0.33, and another hopper in the range from 0.30 to 0.40 with an overlap region labelled A. In this region of overlap the two hoppers occupy the same range and it is difficult to determine if there is just one hopper, or if there is coloration of the noise, or narrowband interference or if there are two hoppers, one in range B and the other one in range A. Moreover, the two hoppers interfere with each, i.e. one appears as noise to the other and it is difficult to measure the dwell time, the hop range, the hop sequence and the like when two hoppers are occupying the same range. In this case, it is necessary to use only one adaptive filter. However, in order for this scheme to work, it is necessary to have a distinguishing feature, e.g. one signal hops much more rapidly than the other (or conversely one has a short dwell time relative to the other). In this case the de-correlation delay in the adaptive filter is set to just longer than the fast hop time and preferably as close as possible to the dwell time of the fast hopper. At the same time, the algorithm convergence time is made as fast as possible. In other words, once the fast hopper has been de-correlated, it is advantageous to get the filters to converge just as fast as possible. Because the fast hopper has a fast dwell time, it appears as wideband to the filter because the convergence time is longer than the dwell time of the hopper. Therefore, the filter does not see any correlation in the two inputs (i.e. the reference and primary input as seen in FIG. 3) whereby the hopper appears to be wideband. The second hopper with the longer dwell time, appears as narrowband because it has a dwell time which is much longer than the convergence time of the adaptive line enhancer. The hop signals are then separated as seen in FIGS. 8 and 9, respectively.

Figure 8:
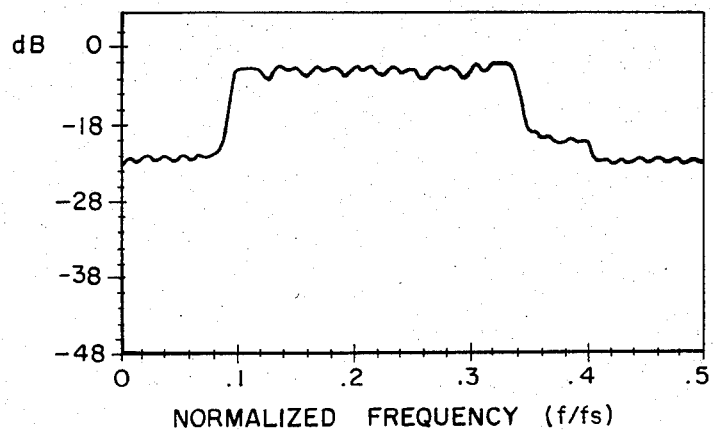

In an operation on the signal shown in FIG. 6, with the delay of the adaptive line enhancer 601, for example set approximately equal to the dwell time of the fast hopper, the approximation of a fast hopper seen in FIG. 8 is obtained. In this Figure, a fast hopper is seen in the range from 0.1 to about 0.33, a little residual of the slow hopper is seen just to the right of the fast hopper in the 0.33 to 0.4 range.

Figure 9:
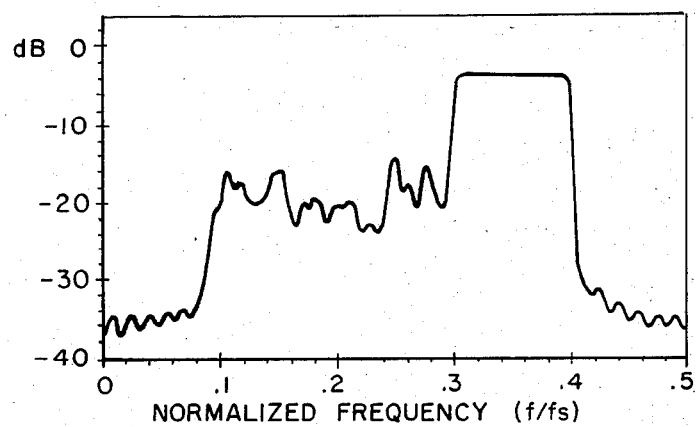
Figure 10:
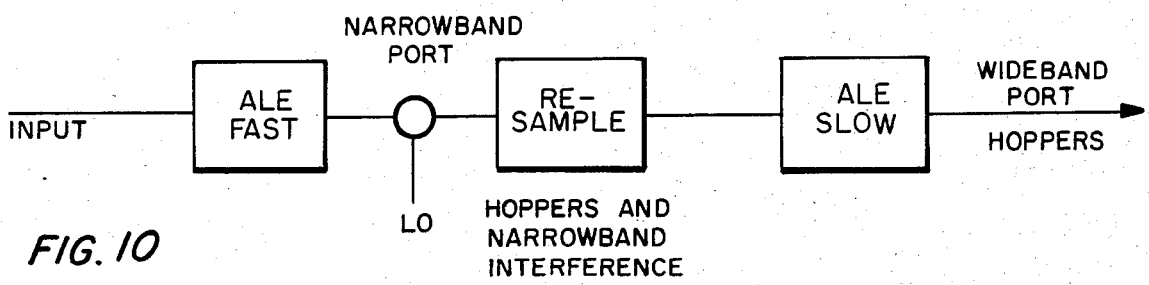
FIGS. 10 and 11 show different embodiments of the instant invention.
Figure 11:
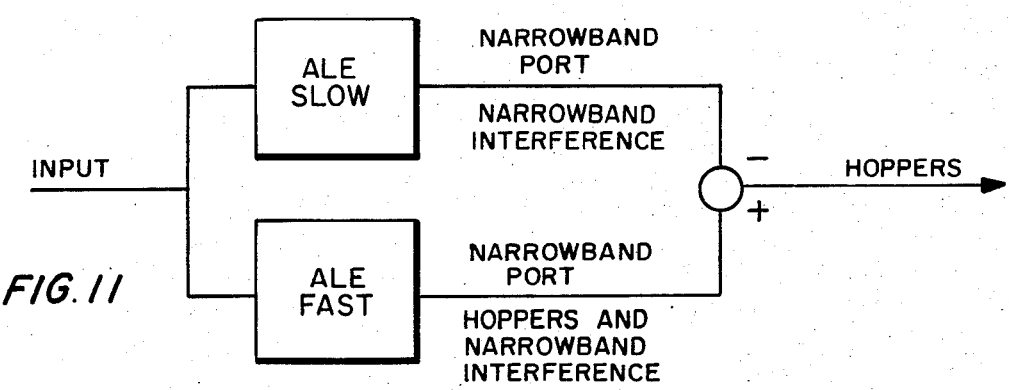

In FIG. 9, there is seen a good approximation of the fast hopper in the range of 0.3 to 0.4, while in the range of 0.1 to the edge of the fast hopper there is seen some residual left over from the slow hopper. Nevertheless, the system has done a good job of separating the two hoppers.

Again, the convergence time of the filter must be much less than the reciprocal of the instantaneous bandwidth of the fast hopper or this system will not work effectively. That is, system will not distinguish between two hoppers which hop at about the same rate because they have about the same correlation time.

A requirement for the first embodiment to be operative is that the de-correlation delay be longer than the dwell time of the hopper in the first filter so that the signal is de-correlated and made to appear wideband whereupon the signals comes out the wideband port. The convergence term, however, can be set at any convenient level. Stated another way, in the case of narrowband interference which is essentially stationary, and very narrow (i.e. it stays at the same center of frequency for long time periods) the convergence factor can be set to be long in order to get accurate convergence. Conversely, if it is non-stationary narrowband interference, it is advantageous to set the convergence factor short.

Thus, there is shown and described a preferred embodiment of an adaptive filter system for enhancing one frequency hop signal or distinguishing between two frequency hop signals. This system uses ALE's as the principal component. The ALE's can be altered by making the decorrelation delay variable and this can be done automatically or manually. Likewise, there can be feedback loops to adjust the weights, to adjust the decorrelation delay and so forth. Other system configurations can be used to effect the same basic concept. These include a slow and a fast ALE connected in series. Likewise, a slow and a fast ALE can be connected in series with a local oscillator and a re-sample network connected therebetween. In the latter case, a mixer is used to combine the LO signal and the narrowband output of the fast ALE prior to supplying the signal to the input of the slow ALE. Also, the slow and fast ALE's, can be connected in parallel with a summer at the output terminals thereof. Furthermore, in producing the ALE's the first filter can include many weights, i.e. more weights provide better resolution. This produces suppression of the narrowband interference and a more accurate approximateion of the wideband signal out of the wideband port. In the second filter, it is generally, desirable to keep the weights to a minimum (within performance limitations) so that it will converge fast. Thus, one of the purposes of this system is to provide an accurate interference-free look at the hopper, so as to estimate characteristics, parameters and properties such as hop range, dwell time and so forth.

Clearly, those skilled in the art may conceive modifications and/or changes to the preferred embodiment described herein. However, any such modifications or changes which fall within the purview of this description, are intended to be included therein. This description is not intended to be limitative of the scope of the description. Rather, the invention is limited only by the scope of the claims appended hereto.

We claim:

1. A time-bandwidth discrimination system for providing enhanced frequency hop detection comprising,
a first adaptive line enhancer (ALE) with a relatively slow convergence factor, and
a second adaptive line enhancer (ALE) with a relatively fast convergence factor connected to said first adaptive line enhancer thereby to separate, isolate and distinguish frequency hop signals from interference signals,
each of said first and second ALEs having an input terminal, a signal output terminal, and an error output terminal wherein, the respective convergence factor is defined by an iterative algorithm by which the signal at the error output terminal is "converged" toward a minimum value.

2. The system recited in claim 1 wherein,
said first and second adaptive line enhancers are connected in series with the error output terminal of said first ALE connected to the input of said second ALE.

3. The system recited in clam 2 wherein, said second ALE produces wideband noise at the error output terminal and produces a frequency hop signal at the signal output terminal.

4. The system recited in claim 1 including,
local oscillator means,
said first and second adaptive line enhancers are connected in series with the signal terminal output of said second ALE connected to the input of said first ALE via said local oscillator means.

5. The system recited in claim 4 including,
re-sample network means connected between said local oscillator means and the input terminal of said first ALE.

6. The system recited in claim 1 including,
summer means connected to receive and sum the signals at the signal output terminals of each of said first and second adaptive line enhancers,
said first and second line enhancers are connected in parallel with the respective input terminals connected together and with the respective signal output terminals thereof supplied to said summer means.

7. The system recited in claim 1 wherein,
said input terminal receives an input signal comprising a frequency hop signal, wideband signals and narrowband signals.

8. The system recited in claim 7 wherein,
said signal output terminal approximates the narrowband signals and said error output terminal approximates the wideband signals supplied to said input terminal.

9. The system recited in claim 8 wherein,
the instantaneous bandwith of the frequency hop signal is less than $1/T_D$ where $T_D$ is the dwell time of the frequency hop signal.

10. The system recited in claim 9, wherein,
the convergence factor of said second ALE must be less than the instantaneous bandwidth of the frequency hop signal.

11. The system recited in claim 1 wherein,
each of said first and second ALEs includes,
de-correlation network means connected to said input terminal in order to receive and operate on input signals supplied thereto,
adaptive tapped delay line means to receive and operate on the signals produced by said de-correlation network means and to supply output signals at said signal output terminal, and
summing means connected to said input terminal and to said output terminal to receive said input signals and said output signals and produce and error signal at said output terminal.

12. The system recited in claim 11, wherein,
said de-correlation network means is defined to have a delay factor slightly longer than time of a fast frequency hop signal and approximately equal to the dwell time thereof in order to separate a fast frequency hop signal from a slower frequency hop signal.

13. The system recited in claim 11 wherein,
said de-correlation network means produces a de-correlation delay which can be varied automatically or manually.

* * * * *